United States Patent

Strolle et al.

Patent Number: 5,757,855
Date of Patent: May 26, 1998

[54] DATA DETECTION FOR PARTIAL RESPONSE CHANNELS

[75] Inventors: Christopher Hugh Strolle, Glenside, Pa.; Tianmin Liu, Lawrenceville; Steven Todd Jaffe, Freehold, both of N.J.

[73] Assignee: David Sarnoff Research Center, Inc., Princeton, N.J.

[21] Appl. No.: 565,608

[22] Filed: Nov. 29, 1995

[51] Int. Cl.$^6$ .................... H04L 5/12; H04L 23/02
[52] U.S. Cl. .................... 375/262; 375/341; 375/344; 371/43; 371/46
[58] Field of Search ................ 375/340–344, 375/350, 266, 231, 254, 262, 355, 233; 371/43, 46, 42, 41

[56] References Cited

U.S. PATENT DOCUMENTS

| | | |
|---|---|---|
| 5,031,195 | 7/1991 | Chevillat et al. .................... 375/234 |
| 5,093,848 | 3/1992 | Raith .................... 375/344 |
| 5,285,480 | 2/1994 | Chennakeshu et al. .................... 375/348 |
| 5,293,401 | 3/1994 | Serfaty .................... 375/231 |
| 5,353,307 | 10/1994 | Lester et al. .................... 375/341 |
| 5,533,067 | 7/1996 | Jamal et al. .................... 375/341 |

*Primary Examiner*—Stephen Chin
*Assistant Examiner*—Don Vo
*Attorney, Agent, or Firm*—William J. Burke

[57] ABSTRACT

A data detector is disclosed which includes a source of a data signal representing a sequence of symbols. A maximum likelihood sequence detector, is coupled to the data signal source, and produces a most likely survivor sequence, which includes a plurality of symbols. A decision feedback equalizer and a phase detector, controlling the timing of the sampling of the data signal, are made responsive to the most likely survivor sequence.

22 Claims, 3 Drawing Sheets

DATA DETECTION FOR PARTIAL RESPONSE CHANNELS

The invention relates to a method and apparatus for data detection for partial response channels.

BACKGROUND OF THE INVENTION

There are types of electronic equipment whose operation may be accurately modeled by a partial response channel. For example, a magnetic recording apparatus, such as a tape recorder or magnetic disk drive may be modeled by a class IV partial response channel. It has become increasingly necessary to increase the density of information stored on such magnetic recording apparatus. Because of saturation effects in the magnetic media, multilevel recording is difficult to implement in such apparatus. Thus, increasing the bit rate is the most promising method of increasing the storage density. To maximize the bit rate, it is necessary to minimize the error rate of the magnetic record/playback path. There are two aspects in minimizing the error rate: first, channel characteristics must be compensated; second, intersymbol interference (ISI) must be suppressed.

Prior efforts to minimize the error rate of magnetic record/playback paths have applied communications channel techniques to the record/playback path. Such a magnetic record/playback path may be roughly modeled by a partial response channel having a $1-D^2$ response characteristic. In such known partial response systems, a bilevel data signal representing a sequence of symbols is precoded and recorded on the magnetic medium. The resulting playback signal may be represented by equation (1)

$$1+a_1D-(1+a_2)D^2+a_3D^3+\ldots+a_nD^n \quad (1)$$

where the $\alpha$'s represent perturbations from an ideal channel response. That is, if all the a's are 0, the channel response is the desired $1-D^2$ response.

In prior systems, the playback signal from this previously recorded medium is passed though an adaptive feedforward equalizer, which is used to shape the record/playback channel response to the desired characteristic. The output signal from the feedforward equalizer is intended to represent the signal which would have been produced had the previously recorded data signal passed through an ideal partial response channel.

The output of the adaptive feedforward equalizer is then passed through a slicer which decides which symbol has been received at each symbol time. This symbol decision is supplied to further utilization circuitry and is also passed through an adaptive decision feedback equalizer whose output is combined with the output of the adaptive feedforward equalizer forming a feedback loop. This feedback loop is intended to suppress any residual trailing ISI caused by the record/playback channel. An error signal, based on the difference between the value of the equalized received signal at the input of the slicer and the value of an ideal received signal corresponding to the symbol decision at the output of the slicer, is used to adjust the coefficients of the adaptive feedforward equalizer and the adaptive decision feedback equalizer in a manner to reduce the value of this error signal. In a similar manner, the symbol decision from the slicer and the value of the equalized received signal at the input of the slicer are used to adjust the phase of the symbol timing clock in such a data detector.

In the above arrangement, decisions about the estimated received symbol are made on a symbol-by-symbol basis. An arrangement to further reduce the error rate involves coupling a known maximum likelihood sequence detector, such as a Viterbi decoder, to the output of the adaptive feedforward equalizer. The Viterbi decoder decides which symbols have been received, as did the slicer, but based on a number of previously received symbols, not on a symbol-by-symbol basis. In a known manner, a Viterbi decoder implements a state machine, termed a trellis, and maintains a sequence of symbol decisions, termed a survivor sequence, for each possible state which may be assumed by the trellis at any symbol time, and an error metric corresponding to each such survivor sequence. For example, if there are two states in the trellis, then two survivor sequences and two corresponding error metrics are maintained.

At each symbol time, the value of the equalized received signal is evaluated to calculate updated error metrics for each state of the trellis, and updated survivor sequences are generated. The updated survivor sequence having the lowest corresponding error metric is assumed to be the data signal sequence most likely to have been recorded. The oldest symbol in that survivor sequence is produced at the output terminal of the Viterbi decoder, and the process repeats for the next symbol. By evaluating a plurality of received symbols at each symbol time, instead of only one, a Viterbi decoder produces an improved bit error rate. The remainder of the known playback system, however, is the same as in the system described above.

As described above, in prior arrangements the feedforward equalizer is intended to shape the channel response, while the decision feedback equalizer is intended to suppress residual trailing ISI. Such an arrangement requires a relatively large feedforward equalizer, with many taps, to properly shape the channel. Any noise introduced into the channel, when passed through such a feedforward equalizer will be non-white in most practical cases. In addition, in most cases the feedforward equalizer cannot exactly shape the channel to the desired characteristics. This reduces the accuracy of any decisions made on the assumption that a channel has the desired characteristic, and is very pronounced in a maximum likelihood sequence detector, such as a Viterbi decoder. Furthermore, the filter taps in a feedforward equalizer are relatively complicated, each requiring a full coefficient multiplier. A relatively large feedforward equalizer is relatively expensive to fabricate. A data detector is desirable which can improve the bit error rate, while simultaneously decreasing the expense of such a data detector.

SUMMARY OF THE INVENTION

In accordance with principles of the invention, placing a maximum likelihood sequence decoder (MLSD) within the decision feedback loop, in place of the slicer, and providing the most likely survivor sequence from the MLSD as input to the adaptive decision feedback equalizer, provides an enhancement of the bit error rate in a channel. By using such a decision feedback equalizer to both shape the channel characteristic to the desired shape and suppress trailing ISI, the complexity of the feedforward equalizer may be substantially reduced, and its cost similarly reduced. In addition, using a symbol decision from the survivor sequence in estimating the error signal used to adapt the coefficients in the adaptive feedforward equalizer and the decision feedback equalizer, and the phase of the symbol timing clock, provides a more reliable error signal, and therefore, a more accurate adaptation of the filter coefficients.

According to the invention, a data detector comprises a source of a data signal representing a sequence of symbols.

A (MLSD) is coupled to the data signal source, and produces a most likely survivor sequence, which includes a plurality of symbols. A decision feedback equalizer is made responsive to the most likely survivor sequence.

Because a MLSD provides increased accuracy in symbol decisions over a symbol-by-symbol slicer, the feedback signal from a decision feedback equalizer arranged according to the invention will more accurately shape the channel characteristics and suppress ISI than a prior art decision feedback equalizer. In addition, the error signal and symbol timing signal, derived from the value of the equalized received input signal and the value of a symbol decision produced by the (MLSD), will be more accurate than those signals derived from a symbol-by-symbol slicer. As a result, the symbol timing and the coefficients in the adaptive feedforward equalizer and the adaptive decision feedback equalizer are adjusted more accurately than in the prior art arrangement.

BRIEF DESCRIPTION OF THE DRAWING

The teachings of the invention can be readily understood by considering the following detailed description in conjunction with the accompanying drawing, in which.

To facilitate understanding, identical reference numerals have been used, where possible, to designate identical elements that are common to the figures.

DETAILED DESCRIPTION

Figure 1:
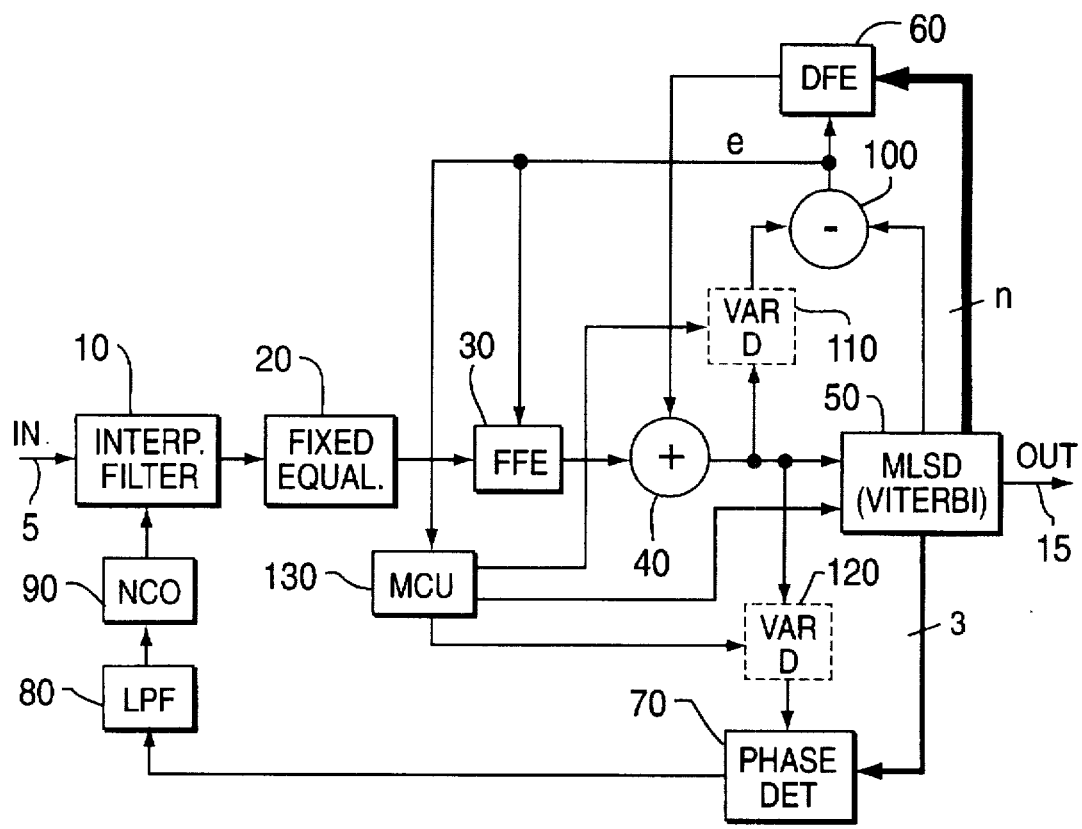
FIG. 1 is a block diagram of a data detector of the invention adapted to detect bilevel signals in a magnetic playback circuit.

FIG. 1 is a block diagram of a data detector of the invention adapted to detect bilevel signals in a magnetic playback circuit. In FIG. 1, an input terminal 5 is coupled to an output terminal of a magnetic playback front end (not shown). This playback front end may, for example, include a magnetic medium read head, an analog amplifier, and a Nyquist filter, arranged and operating in a known manner. The signal at the input terminal 5 is a signal representing a playback signal from a magnetic medium onto which a digital signal has been previously recorded. The input terminal 5 is coupled to an input terminal of a serial connecion of an interpolating filter 10, a fixed equalizer 20, and an adaptive feedforward equalizer (FFE) 30, all of which are constructed and operate in a known manner. The filter 10 includes a signal sampler, and produces a sampled data signal, with sampling times controlled by a timing signal from a timing control input terminal.

An output terminal of the FFE 30 is coupled to a first input terminal of an adder 40. An output terminal of the adder 40 is coupled to an input terminal of a maximum likelihood sequence detector (MLSD) 50, which may, for example, be a Viterbi decoder, and to respective first input terminals of a subtractor 100 and a phase detector 70. An output terminal of the MLSD 50 is coupled to an output terminal 15. Output terminal 15 produces a sequence of playback symbol decisions which represent the detected data signal previously recorded on the magnetic medium, and is coupled to further utilization circuitry (not shown) in the magnetic playback system. A second output terminal of the MLSD 50 is coupled to a second input terminal of the subtractor 100. A third output terminal of the MLSD 50, illustrated in FIG. 1 as a broad arrow carrying 3 symbol decisions, is coupled to a second input terminal of the phase detector 70; and a fourth output terminal of the MLSD 50, also illustrated on FIG. 1 as a broad arrow and carrying n symbol decisions, is coupled to an input terminal of a decision feedback equalizer (DFE) 60.

An output terminal of the detector 70 is coupled to the timing control input terminal of the filter 10 through the serial connection of a low pass filter (LPF) 80 and a numerically controlled oscillator (NCO) 90. An output terminal of the DFE 60 is coupled to a second input terminal of the adder 40. An output terminal of the subtractor 100 produces an error signal e, and is coupled to respective control input terminals of the DFE 60, the FFE 30 and a monitor and control unit (MCU) 130. Respective control output terminals of the MCU 130 are coupled to corresponding input terminals of the MLSD 50.

In operation, a binary signal is recorded onto a magnetic medium in a known manner by a record system (not shown). In the illustrated embodiment, the symbols to be recorded on the tape are either a binary '1' or a binary '0'. These symbols are first processed in a known manner by an interleaved NRZI precoder having the characteristic $1/(1 \oplus D^2)$. One skilled in the art understands that the coded sequence produced by this precoder may be considered to be two time interleaved symbol sequences, each of which produces a recording signal in which a binary '1' is recorded as a flux transition (either +or −) at a symbol time and a binary '0' is recorded as the absence of a flux transition at a symbol time. The sequence of reproduced symbols resulting from playing back such a prerecorded coded sequence may be de-interleaved and processed as two separate symbol streams, each having a (1−D) characteristic, either by two (1−D) decoders, or a single pipelined (1−D) decoder. The remainder of this application will describe a decoder for processing one such (1−D) symbol stream.

When the magnetic medium is played back, the circuitry illustrated in FIG. 1 analyzes the signals from the playback front end to detect the symbol times of one de-interleaved symbol sequence, and to estimate which symbol, binary '1' or binary '0', was recorded at that symbol time. The playback signal from the playback front end (not shown) representing a single symbol may last for such a time period that a portion of that signal is still present at the next symbol time, and, in fact, may have a significant residual value for several subsequent symbol times. This trailing residual signal value is termed trailing ISI. In an ideal channel, however, the residual values of the playback signal at subsequent symbol times are known and may be used to help properly identify the recorded symbol, or may otherwise be compensated for. The trailing ISI resulting from passing a signal through an ideal channel, therefore, is desired ISI. For example, in a (1−D) channel, the trailing residual signal value resulting from the D term is desired ISI and transforms the bilevel signal previously recorded on the magnetic medium into a trilevel signal. The trailing residual signal value resulting from transmission of such a signal through an ideal (1−D) channel may be used to identify and properly receive each symbol.

The equalizers in the playback system compensate for any channel imperfections and attempt to generate a playback signal as if it had passed through an ideal (1−D) channel. However, if the channel is not ideal, and/or if the equalization of the channel by the playback system is not perfect, then the residual value of each symbol signal at subsequent symbol times cannot be perfectly compensated for, and errors can result in the playback system. The difference between the actual residual values of a received symbol signal at subsequent symbol times and those desired values which would be expected in an ideal channel may be considered noise, and is termed undesirable ISI. Another noise component is random noise introduced by the magnetic medium and the electronics. These noise components all introduce errors in the playback signal In general, the playback system illustrated in FIG. 1 is arranged in a similar manner to known systems previously proposed for use with partial response channels. However, it operates differently. In the previously proposed playback systems, the adaptive feedforward equalizer provided channel shaping, and the decision feedback equalizer provided undesirable trailing ISI suppression. That is, referring to equation (1), for a (1−D) channel, the adaptive feedforward equalizer adjusts its coefficients to set $a_1$ and $a_2$ to zero. The decision feedback equalizer adjusts its coefficients to set the $a_3$ through $a_n$ to zero. However, in the playback system illustrated in FIG. 1, the DFE 60 provides both channel shaping and the suppression of undesirable ISI. That is the DFE 60 adjusts its coefficients to set all of $a_1$ through $a_n$ to zero. The FFE 30 provides only precursor ISI suppression. Thus, in the illustrated embodiment, the FFE 30 can have fewer taps than in prior art feedforward equalizers. Because the taps of the FFE 30 each include a full multiplier, while the taps of the DFE 60 may be hardwired without a full multiplier (in a manner to be described below), the FFE 30 taps are more complicated and expensive than the DFE 60 taps. Thus, it is desirable to reduce the number of taps in the FFE 30 and replace them with taps in the DFE 60 to produce a simpler circuit which is less expensive to fabricate.

In the embodiment illustrated in FIG. 1, the output terminal of the adder 40 is intended to produce a signal representing the previously recorded data signal as if it had passed though an ideal 1−D class IV partial response channel. This signal is processed by the MLSD 50 in a known manner to produce a sequence of symbol decisions at the output terminal 15 which represent the most likely sequence of symbols in the previously recorded data input signal. As is known, a Viterbi decoder maintains two survivor paths for such a channel, and an error metric for each such survivor path. One survivor path is the sequence of symbol decisions which produces the least square error for the sequence of symbol decisions ending in the first state in the trellis, and a second survivor path is the sequence of symbol decisions which produces the least square error for the sequence of symbol decisions ending in the second state in the trellis. The error metric associated with the first survivor path is compared with the error metric associated with the second survivor path. The survivor path having the smaller error metric is assumed to contain the sequence of symbols most likely to have been previously recorded and the oldest symbol in that sequence is output to the output terminal 15 from the MLSD 50.

In a prior art playback system, a decision feedback equalizer is implemented as a transverse filter with a predetermined number of delay elements, arranged as a shift register, and coupled to the output of the slicer, each element holding one symbol. The delay elements, thus, hold some predetermined number of symbol decisions. The outputs of the delay elements, representing these symbol decisions, are coupled to respective coefficient multipliers and the signals from the coefficient multipliers are summed to produce the output signal of the DFE.

In the Viterbi decoder 50, each of the survivor sequences are also sequences of a predetermined number of symbol decisions, with the survivor sequence having the smallest corresponding error metric being selected as the sequence which was most likely previously recorded. In the illustrated embodiment each such symbol decision is a trilevel signal having a value of +2, 0 or −2, which is the result of passing the initially recorded binary data through the partial response channel. In the DFE 60 of FIG. 1, the survivor sequence from the MLSD 50, selected on the basis of the error metrics, as described above, is supplied to respective coefficient multipliers in the DFE 60 (instead of the outputs of a series of delay elements) as illustrated by the broad arrow from the MLSD 50 to the DFE 60. The signals from the coefficient multipliers are summed to produce the DFE 60 output signal, as before. Because the survivor sequence in a Viterbi decoder is selected on the basis of a number of adjacent symbols, it has a lower error rate than the output of a symbol-by-symbol slicer, and the output signal from the DFE 60 is more reliable than that from a prior art decision feedback equalizer.

The signal supplied from the MLSD 50 to the subtractor 100 represents the symbol decision made with respect to the equalized received signal currently at the input of the MLSD 50. This signal corresponds to the signal which would be produced by a symbol-by-symbol quantizer, but is more reliable due to the operation of the Viterbi decoder, as described above. The subtractor 100 generates an error signal e, representing the difference between the value of the equalized received signal and the value of that symbol decision. This error signal e is used to adjust the coefficients in the FFE 30 and the DFE 60, using a least mean squares (LMS) algorithm, all in a known manner.

The signal from the MLSD 50 to the detector 70 contains three time-adjacent symbol decisions. Specifically, the symbol decision corresponding to the symbol currently being received, and the two time-adjacent symbol decisions to the current decision are supplied to the detector 70. The phase detector 70 operates in a known manner on these three sample decisions, and upon the current equalized received signal from the output terminal of the adder 40 to control the sample timing of the interpolating filter 10.

In FIG. 1, the MLSD 50 provides the youngest symbol decision (corresponding to the current equalized received signal from the adder 40) to the subtractor 100. However, it may be desirable to use an older symbol decision from the survivor sequence when generating the error signal e, because older symbols in the survivor sequence are more reliable than younger symbols. If an older symbol decision is used to generate the error signal e, then the equalized received signal supplied to the other input terminal of the subtractor 100 must be delayed by a corresponding time period. A delay element 110, illustrated in phantom in FIG. 1, is coupled between the output terminal of the adder 40 and the first input terminal of the subtractor 100. The delay element 110 provides the appropriate amount of time delay to properly time-align the symbol decision from the MLSD 50 with the equalized received signal from the adder 40. In such a case, it is also necessary that the symbol decisions from the survivor sequence used by the LMS algorithm be delayed by a similar time delay. To properly time align the symbol decisions used by the LMS algorithm to the error signal e, additional storage and time delay elements (not shown) are included in the MLSD 50, all in a known manner.

It is further possible that the symbol decision from the MLSD 50 may be varied during the operation of the FIG. 1 receiver. For example, it may be desired to use the youngest symbol decision when the receiver is started, and then use older symbol decisions at later times. In such an arrangement the delay element 110 is a variable delay element. A first output terminal of the MCU 130 is coupled to a corresponding input terminal of the MLSD 50 to control the selection of the symbol decision to be supplied to the subtractor 100. In addition, a second output terminal from the MCU 130 is coupled to a corresponding control input terminal of the variable delay element 110, and the duration of the delay introduced by the delay element 110 is appropriately controlled by the MCU 130. The additional storage and time delay elements discussed above (not shown) included in the MLSD 50 to properly time align the symbol decisions used by the LMS algorithm to the error signal e are also made variable in response to the control signal from the MCU 130 in an appropriate manner.

For similar reasons, it may also be desirable for the three time-adjacent symbol decisions supplied from the MLSD 50 to the phase detector 70 to be three time-adjacent older symbol decisions from the survivor sequence. For the same reason as for the subtractor 100, the equalized received signal from the output terminal of the adder 40 must be delayed by an appropriate amount to correspond in time with the older three symbol decisions being supplied to the detector 70. A second delay element 120 is illustrated in phantom in FIG. 1, and is coupled between the output terminal of the adder 40 and the input terminal of the detector 70. The second delay element 120 provides the appropriate amount of time delay to properly time-align the three symbol decisions from the MLSD 50 with the equalized received signal from the adder 40. Again, it is possible that the three symbol decisions from the MLSD 50 may be varied during the operation of the 10 receiver. In this situation, the second delay element 120 is also a variable delay element, and an output terminal of the MCU 130 is coupled to a corresponding control input terminal of the variable delay element 120 to appropriately control the duration of its time delay.

Figure 2:
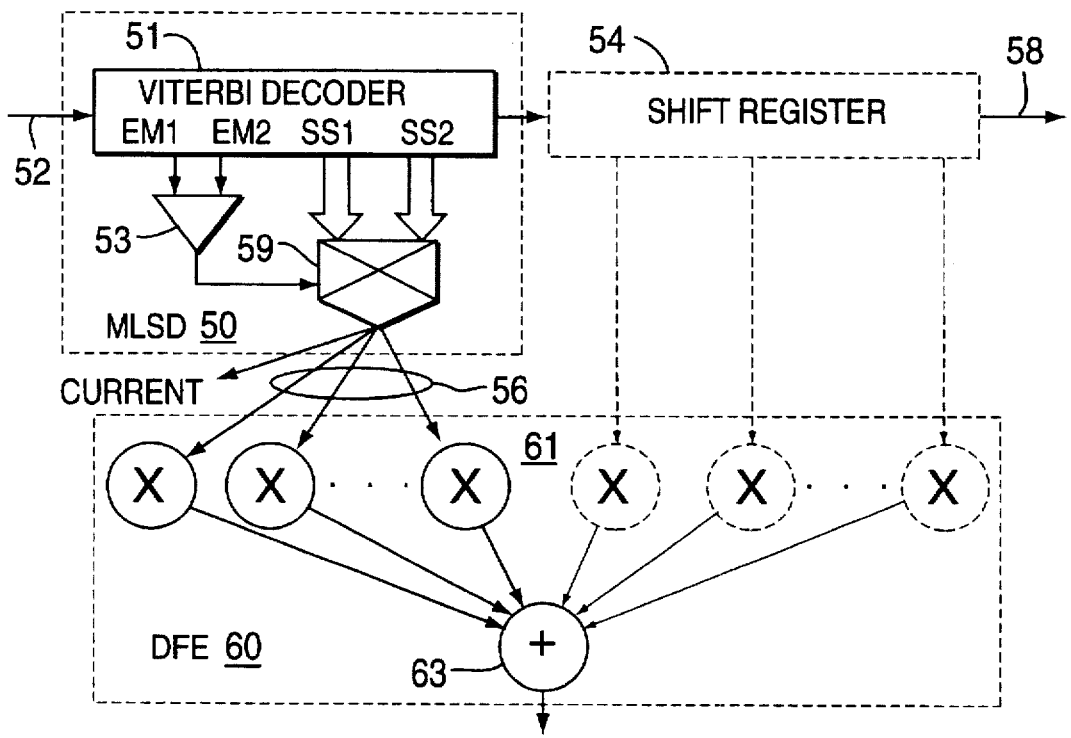
FIG. 2 is a more detailed block diagram of a maximum likelihood sequence decoder (MLSD) and decision feedback equalizer of FIG. 1.

FIG. 2 is a more detailed block diagram of a maximum likelihood sequence detector 50 and decision feedback equalizer 60, as illustrated in FIG. 1. In FIG. 2, broad arrows represent signal lines carrying signals representing a plurality of symbol decisions. In FIG. 2, the input terminal 52 of the MLSD 50 is coupled the output terminal of the adder 40. The input terminal 52 is coupled to the input terminal of a Viterbi decoder 51. An output terminal of the Viterbi detector 51 is coupled to an output terminal 58 of the MLSD 50. The output terminal 58 of the MLSD 50 is coupled to the output terminal 15 of the playback system. As is known, the decoder 51 maintains two survivor sequences (SSs), one for each state in the trellis, and an error metric (EM) for each such survivor sequence.

The Viterbi decoder 51 is modified to include a first output terminal SS1 producing a signal representing the plurality of symbol decisions forming the first survivor sequence, and a second output terminal SS2 producing a signal representing the plurality of symbol decisions forming the second survivor sequence. The modified Viterbi decoder also includes output terminals EM1 and EM2 producing signals representing the values of the first and second error metrics, respectively, corresponding to the first and second survivor sequence SS1 and SS2. Although two survivor sequence output terminals, SS1 and SS2, and two error metric output terminals EM1 and EM2, are illustrated for FIG. 2, it will be understood by one skilled in the art that channels having different response characteristics will have different numbers of survivor sequences and corresponding error metrics. For example, a channel having the known alternate desired response characteristic:

$$P(D)=(1+D)2(1-D)=1+D-D^2-D^3 \tag{2}$$

will have eight survivor sequences, and a Viterbi decoder modified as described above will have eight SS output terminals, one for each survivor sequence, and eight EM output terminals for the eight corresponding error metrics. One skilled in the art of design and implementation of Viterbi decoders will understand how to modify such a decoder to include the additional output terminals described above.

In FIG. 2, output terminal SS1 of the Viterbi decoder 51 is coupled to a first data input terminal of a multiplexer 59, and output terminal SS2 of the Viterbi decoder 51 is coupled to a second data input terminal of the multiplexer 59. The output terminal EM1 is coupled to a first input terminal of a comparator 53 and output terminal EM2 is coupled to a second input terminal of the comparator 53. An output terminal of the comparator 53 is coupled to a control input terminal of a multiplexer 59. An output terminal of the multiplexer 59 is coupled to the second output terminal 56 of the MLSD 50.

In operation, the respective error metrics EM1 and EM2 are compared in the comparator 53, which produces a signal to indicate which is the smaller error metric. If the error metric EM1, corresponding to the first survivor sequence SS1, is less than the error metric EM2, corresponding to the second survivor sequence SS2, then the comparator 53 generates a signal at its output terminal which conditions the multiplexer 59 to couple the signal at its first input terminal, which is the first survivor sequence SS1, to its output terminal. If the error metric EM1 is greater than the error metric EM2, then the comparator 53 generates a signal at its output terminal which conditions the multiplexer 59 to couple the second survivor sequence SS2 signal to its output terminal. The multiplexer 59, therefore, always produces the most likely survivor sequence at its output terminal, and consequently at the output terminal 56 of the MLSD 50.

As described above, the most likely survivor sequence is a plurality of symbol decisions, each decision having a value of +2, 0 or −2. The DFE 60 illustrated in FIG. 2 includes a plurality of coefficient multipliers 61, one for each symbol decision in the survivor sequence, except for the youngest symbol decision corresponding to the current equalized received signal from the adder 40. At the output terminal 56, each symbol decision is represented by a separate signal line. Respective signals representing each symbol decision are coupled to first input terminals of a corresponding plurality of coefficient multipliers 61. Respective output terminals from the plurality of coefficient multipliers 61 are coupled to corresponding input terminals of a summer 63. An output terminal of the summer 63 is coupled to the second input terminal of the adder 40 (of FIG. 1). In order to simplify FIG. 2, respective second input terminals of each of the plurality of coefficient multipliers 61 are not shown. One skilled in the art of equalizer design will understand that the coefficients supplied to second input terminals (not shown) are generated using the least mean square algorithm, in a known manner, in response to the error signal e.

Because the symbol decisions have values of +2, 0 or −2, the coefficient multipliers 61 illustrated in FIG. 2 need not include full multipliers. Instead the value of the coefficient may be bit shifted to multiply it by two, and the bit shifted coefficient arithmetically negated to multiply it by −2. Then a multiplexer (not shown) may be used to supply the bit shifted coefficient to the adder 63 if the value of the symbol decision is +2, the arithmetically negated bit shifted coefficient to the adder 63 is the value of the symbol decision is −2, or a zero valued signal to the adder 63 if the value of the symbol decision is 0. This arrangement is simpler and less expensive than a full multiplier.

In operation, the combination of the MLSD 50, containing the modified Viterbi decoder 51, and the DFE 60, as illustrated in FIG. 2 cooperate to form a transverse filter, in which the survivor sequence supplied by the multiplexer 59 substitutes for a tapped delay line in a prior art transverse filter. The output signal from the adder 63, when combined with the output signal from the FFE 30 both shapes the channel response characteristic, and suppresses undesirable trailing ISI. The improved accuracy provided by the use of the selected survivor sequence in the DFE 60, instead of a tapped delay line, provides a decrease in the error rate and consequently allows an increase in the data density when designing to a predetermined bit error rate.

It is also possible to provide a DFE 60 transverse filter which is wider than the number of symbol decisions in the most likely survivor sequence. An arrangement to provide this capability is illustrated in phantom in FIG. 2 by a shift register 54 coupled between the output terminal of the Viterbi decoder 51 and the output terminal 58 of the MLSD 50. Respective output terminals of the shift register 54 are coupled to corresponding first input terminals of additional coefficient multipliers 61, also illustrated in phantom in FIG. 2. Respective output terminals of the coefficient multipliers 61 are coupled to additional corresponding input terminals of the summer 63. The shift register 54 operates in the same manner as the shift register in the prior art transverse filter. For example, if the length of the survivor sequence in the Viterbi decoder is eight symbols, a DFE 60 of 16 taps may be implemented by including an eight stage shift register 54.

Figure 3:
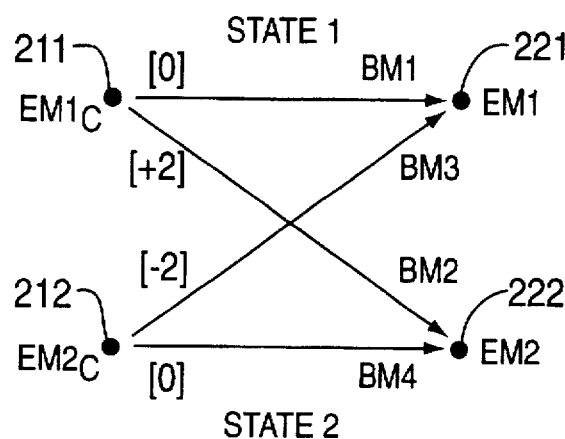
FIG. 3 is a diagram illustrating the trellis for a partial response channel.
Figure 4:
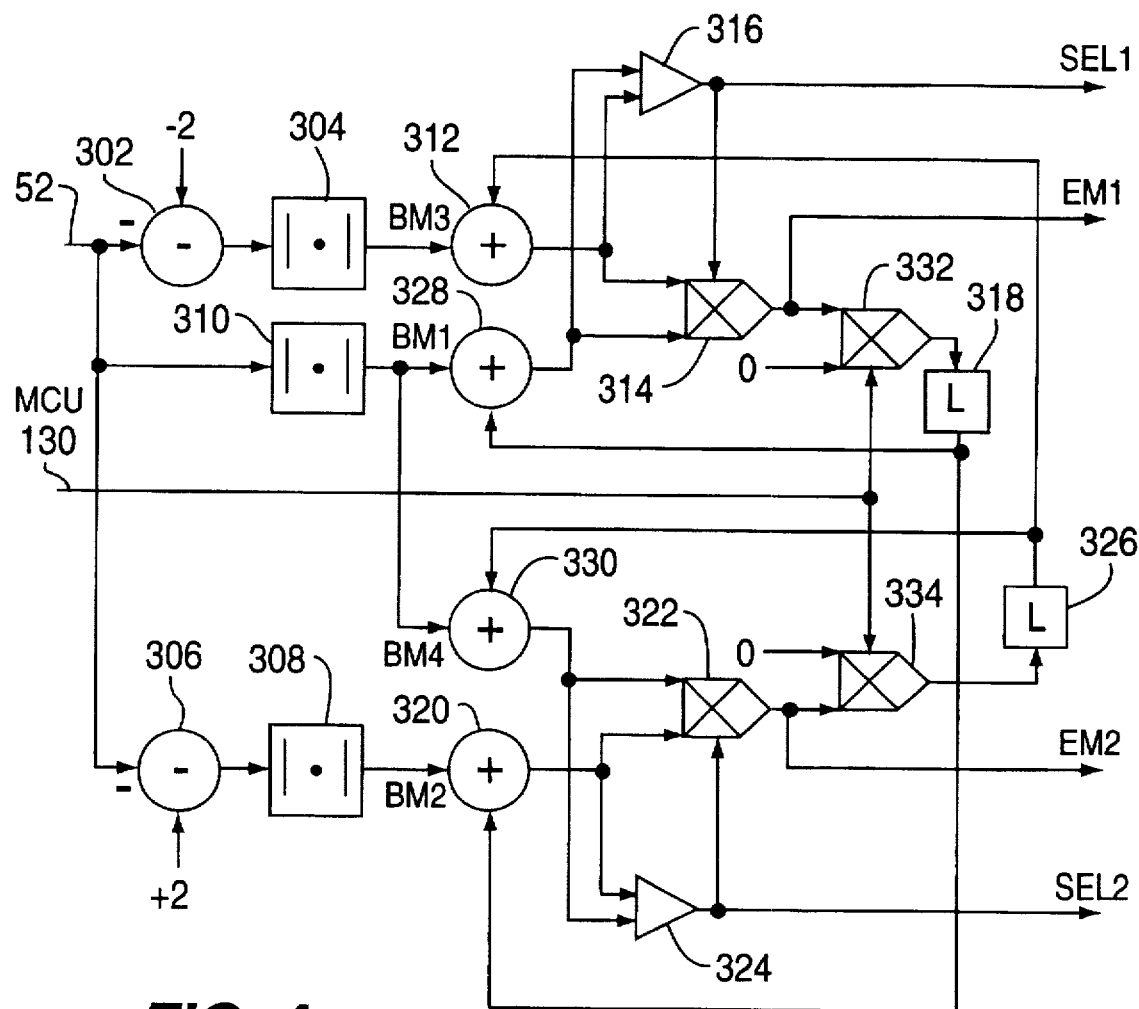
FIGS. 4 and 5 are more detailed block diagrams illustrating respective portions of the MLSD of FIG. 2.
Figure 5:
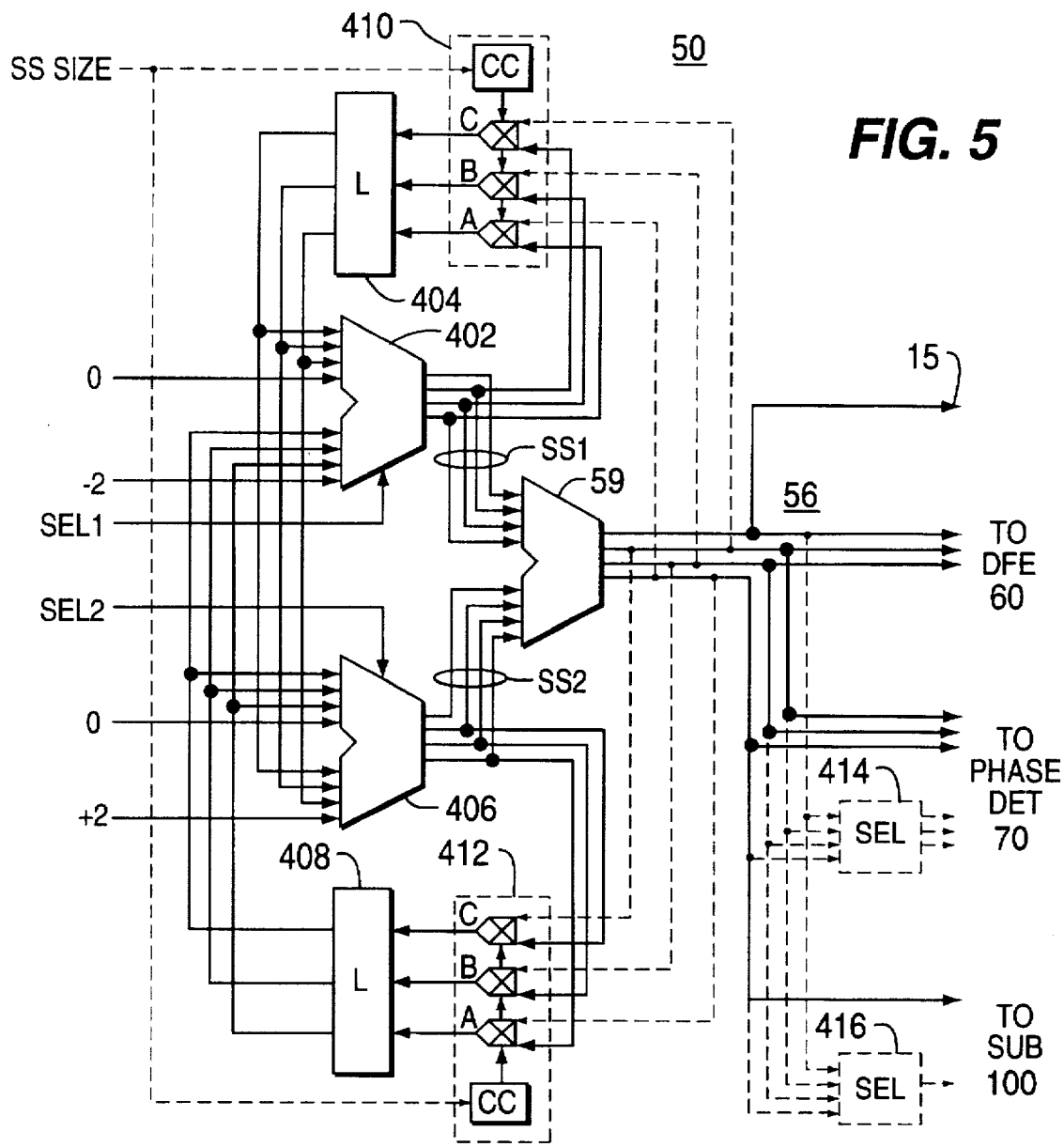

FIGS. 4 and 5 are block diagrams illustrating portions of the maximum likelihood sequence decoder illustrated in FIGS. 2 and 3 is a diagram illustrating the trellis for one de-interleaved symbol stream of a $P(D)=1-D^2$ partial response channel, which is useful in understanding the operation of the portions of the MLSD 50 illustrated in FIGS. 4 and 5. In FIG. 3, the upper vertices 211 and 221 represent the state 1 in the trellis, and the lower vertices 212 and 222 represent the state 2. The leftmost vertices 211 and 212 represent the current state, and the rightmost vertices 221 and 222 represent the new state. Branches from the respective vertices representing the current state (211, 212) to the respective vertices representing the new state (221, 222) are illustrated by arrows from the current state vertices (211, 212) to the new state vertices (221,222). Associated with each current state vertex is an error metric: $EM1_C$ associated with the current state 1 at vertex 211 and $EM2_C$ associated with the current state 2 at vertex 212. Associated with each new state vertex is an updated error metric: EM1 associated with the new state 1 at vertex 221 and EM2 associated with the new state 2 at vertex 222.

From any particular current state, the trellis may either move along a branch in the trellis to the other state, indicating receipt of a binary '1', or move along a branch in the trellis remaining in the same state, indicating receipt of a binary '0'. The value of the ideal received equalized input signal which will cause a transition is illustrated in square brackets adjacent the branch in the trellis which would be followed upon receipt of that input signal. Thus, starting at vertex 211, representing state 1, receipt of an equalized input signal having the value zero will result in remaining in state 1 at the next symbol time, ending at vertex 221. This represents the receipt of a binary '0'. Receipt of an equalized input signal having the value +2 will result in a transition to state 2, ending at vertex 222. This represents the receipt of a binary '1'. Similarly, starting at vertex 212, representing state 2, receipt of an equalized input signal having the value zero will result in remaining in state 2 at the next symbol time, ending at vertex 222, representing receipt of a binary '0'; and receipt of an equalized input signal having a value −2 will result in a transition to state 1, ending at vertex 221, representing receipt of a binary '1'.

However, in actual decoders, ideal input signals are seldom received. For each branch in the trellis, a branch metric BM is calculated. For each branch, the magnitude of the difference between the actual received equalized input signal and the ideal input signal for that branch is calculated. These magnitudes, called branch metrics (BMs), are then accumulated with the error metrics associated with the respective source vertices of those branches to form the respective updated error metrics. These updated error metrics are used to determine the most likely sequence.

There are two ways of arriving at vertex 221 representing state 1 for the new symbol: via a zero signal from vertex 211 or via a −2 signal from vertex 212. Branch metric BM1 is calculated for the branch from vertex 211 to vertex 221 and branch metric BM3 is calculated for the branch from vertex 212 to vertex 221. These branch metrics are accumulated with the respective error metrics associated with their source vertices. Branch metric BM1 is accumulated with the current error metric $EM1_C$ to produce an updated error metric associated with the branch from vertex 211 to vertex 221, and branch metric BM3 is accumulated with the current error metric EM2C to produce an updated error metric associated with the branch from vertex 212 to vertex 221. The updated error metric having the smaller value is assumed to represent the more likely branch to arrive at state 1 and becomes the updated error metric EM1 associated with vertex 221.

Similarly, branch metric BM2 is calculated for the branch from vertex 211 to vertex 222 and branch metric BM4 is calculated for the branch from vertex 212 to vertex 222. Branch metric BM2 is accumulated with the current error metric $EM1_C$ to produce an updated error metric associated with the branch from vertex 211 to vertex 222, and branch metric BM4 is accumulated with the current error metric $EM2_C$ to produce an updated error metric associated with the branch from vertex 212 to branch 222. The updated error metric having the smaller value is assumed to represent the more likely branch to arrive at state 2 and becomes the updated error metric EM2 associated with vertex 222. The vertex having the smaller updated error metric (EM1 or EM2) is the most likely state, and the survivor sequence ending in that state is selected as the most likely survivor sequence.

FIG. 4 illustrates the portion of the MLSD 50 which calculates the branch metrics BM1–BM4 and updated error metrics EM1 and EM2. In FIG. 4, the input terminal 52 receives the equalized received input signal from the adder 40. Input terminal 52 is coupled to a series connection of a first subtractor 302 and a first absolute value circuit 304, to a series connection of a second subtractor 306 and a second absolute value circuit 308 and to a third absolute value circuit 310. An output terminal of the first absolute value circuit 304 produces a signal representing branch metric BM3 and is coupled to a first input terminal of a first adder 312. An output terminal of the first adder is coupled to a first signal input terminal of a first multiplexer 314 and a first input terminal of a first comparator 316. An output terminal of the first multiplexer 314 produces a signal representing the first error metric EM1 and is coupled to the first error metric output terminal EM1 of the MLSD 50.

An output terminal of the second absolute value circuit 308 produces a signal representing the branch metric BM2 and is coupled to a first input terminal of a second adder 320. An output terminal of the second adder 320 is coupled to a first data input terminal of a second multiplexer 322 and to a first input terminal of a second comparator 324. An output terminal of the second multiplexer 322 produces a signal representing the second error metric EM2 and is coupled to the second error metric output terminal EM2 of the MLSD 50.

An output terminal of the third absolute value circuit 310 produces a signal representing both branch metrics BM1 and BM4 and is coupled to respective first input terminals of respective third and fourth adders 328 and 330. An output terminal of the third adder 328 is coupled to a second data input terminal of the first multiplexer 314 and a second input terminal of the first comparator 316. An output terminal of the first comparator 316 is coupled to a control input terminal of the first multiplexer 314 and to a first selector signal output terminal SEL1. An output terminal of the fourth adder 330 is coupled to a second data input terminal of the second multiplexer 322 and to a second input terminal of the second comparator 324. An output terminal of the second comparator 324 is coupled to a control input terminal of the second multiplexer 322 and to a second selector signal output terminal SEL2.

The output terminal of the first multiplexer 314, producing the first error metric signal EM1, is also coupled to a first data input terminal of a third multiplexer 332. A second data input terminal of the third multiplexer 332 is coupled to a source of a zero-valued signal. An output terminal of the third multiplexer 332 is coupled to an input terminal of a first latch 318. An output terminal of the latch 318 is coupled to respective second input terminals of the second adder 320 and the third adder 328. The output terminal of the second multiplexer 322, producing the second error metric signal EM2, is also coupled to a first data input terminal of a fourth multiplexer 334. A second data input terminal of the fourth multiplexer 334 is coupled to a source of a zero-valued signal. An output terminal of the fourth multiplexer 334 is coupled to an input terminal of a second latch 326. An output terminal of the latch 326 is coupled to respective second input terminals of the first adder 312 and fourth adder 330. Respective control input terminals of the third and fourth multiplexers 332 and 334 are coupled in common to a corresponding control output terminal of the monitor and control unit (MCU) 130.

In operation, the series connection of the first subtractor 302 and first absolute value circuit 304 calculates the magnitude of the difference between the received equalized input signal from input terminal 52 and a signal having the value −2, which is the ideal value of the input signal for the branch from vertex 212 to vertex 221. Referring back to FIG. 3, this is branch metric BM3. Similarly, the series connection of the second subtractor 306 and the second absolute value circuit 308 calculates the magnitude of the difference between the received equalized input signal from input terminal 52 and a signal having the value 2. Referring back to FIG. 3, this is branch metric BM2. The third absolute value circuit 310 calculates the magnitude of the difference between the received equalized input signal from input terminal 52 and a zero-valued signal. Referring to FIG. 3, this is both branch metric BM1 and BM4.

During normal operations, the third multiplexer 332 is conditioned to couple the signal from the first multiplexer 314 to its output terminal, and the fourth multiplexer 334 is conditioned to couple the signal from the second multiplexer 322 to its output terminal. (The other mode of operation for the third and fourth multiplexers 332 and 334 will be discussed in detail below.) The first latch 318 holds the updated error metric EM1 from the previous symbol time at its output terminal. Thus, for each new symbol time, the first latch 318 produces the first error metric for the previous symbol time, illustrated on FIG. 3 as $EM1_C$. Similarly, the second latch produces the second error metric for the previous symbol time, illustrated on FIG. 3 as $EM2_C$.

Thus, during normal operations, the respective first, second, third and fourth adders, 312, 320, 328 and 330, all act as accumulators to generate updated error metrics for each possible branch in the trellis illustrated in FIG. 3. The first adder accumulates the updated error metric associated with the branch starting at vertex 212 in state 2 (having the current error metric $EM2_C$) and moving to state 1 at vertex 221. To do this error metric $EM2_C$ from the latch 326 is accumulated with branch metric BM3 from the absolute value circuit 304 in the first adder 312. The output signal from the first adder 312 represents the result of this accumulation. Similarly, the second adder 320 accumulates the error metric $EM1_C$ with branch metric BM2 and its output signal represents the error metric associated with the branch from vertex 211 at state 1 to vertex 222 at state 2; the third adder 328 accumulates the error metric $EM1_C$ with branch metric BM1 and represents the error metric associated with the branch within state 1 from vertex 211 to vertex 221; and the output of the fourth adder 330 represents the accumulation of error metric $EM2_C$ with branch metric BM4 and represents the error metric associated with the branch within state 2 from vertex 212 to vertex 222.

The first comparator 316 compares the two updated error metrics ending at vertex 221 in state 1, and produces a select signal SEL1 representing the smaller updated error metric. The output signal from the first comparator 316 conditions the first multiplexer 314 to couple the signal representing the smaller error metric to its output terminal. If the accumulated error metric from the first adder 312 is smaller than that from the third adder 328, the select signal SEL1 from the first comparator 316 conditions the first multiplexer 314 to couple the output from the first adder 312 to its output terminal. If the accumulated error metric from the first adder 312 is larger than that from the third adder 328, the select signal SEL1 from the first comparator 316 conditions the first multiplexer 314 to couple the output from the third adder 328 to its output terminal and becomes the error metric EM1 for the new symbol time.

Similarly, the second comparator 324 compares the two accumulated error metrics ending at vertex 222 in state 2, and produces a select signal SEL2 representing the smaller accumulated error metric. The output signal from the second comparator 324 conditions the second multiplexer 322 to couple the signal representing the smaller error metric to its output terminal. If the accumulated error metric from the second adder 320 is smaller than that from the fourth adder 330, the select signal SEL2 from the second comparator 324 conditions the second multiplexer 322 to couple the output from the second adder 320 to its output terminal. If the accumulated error metric from the second adder 320 is larger than that from the third adder 330, the select signal SEL2 from the second comparator 324 conditions the second multiplexer 322 to couple the output from the fourth adder 330 to its output terminal. The error metric passed through the second multiplexer 322 becomes the error metric EM2 for the new symbol time.

FIG. 5 is a block diagram illustrating the portion of the MLSD 50 maintaining the two survivor sequences. In FIG. 5, it is assumed that four symbol decisions are maintained in each of the two survivor sequences SS1 and SS2. One skilled in the art will understand that there may be more or fewer symbols maintained in each survivor sequence, and will understand how to modify the portion of the MLSD 50 illustrated in FIG. 5 to maintain the desired number of symbols in the survivor sequences. In general in FIG. 5, at each data input and output terminal of the respective elements illustrated in FIG. 5 the signal lines carrying symbol decisions are arranged in order with the signal line carrying the most recent symbol being illustrated at the bottom of the input or output terminal and the signal line carrying the oldest symbol being at the top.

In FIG. 5, an output terminal of a first four-input multiplexer 402 produces symbol decisions making up the first survivor sequence SS1, in which the bottom signal line carries the most recent symbol and the top signal line carries the oldest symbol. The output terminal of the first multiplexer 402 is coupled to a first data input terminal of the multiplexer 59 (also illustrated in FIG. 2), and to respective first data input terminals of the first multiplexer 402 and a second four-input multiplexer 406 through a first three-input latch 404. An output terminal of the second multiplexer 406 produces symbol decisions making up the second survivor sequence SS2, and is coupled to a second data input terminal of the multiplexer 59, and to respective second data input terminals of the second multiplexer 406 and the first multiplexer 402 through a second three-input latch 408. The selection signals SEL1 and SEL2 (from FIG. 4) are coupled to respective control input terminals of the first multiplexer 402 and the second multiplexer 406.

The output terminal of the multiplexer 59 is controlled as illustrated in FIG. 2 to produce the most likely survivor sequence at output terminal 56. The top signal line at output terminal 56, carrying the oldest symbol decision, is passed through output terminal 15 to utilization circuitry, as illustrated in FIG. 1. The bottom signal line, carrying the newest symbol decision, corresponding to the current equalized received input signal, is supplied to the subtractor 100, as illustrated in FIG. 1 and the bottom three signal lines carrying the three newest symbol decisions are supplied to the detector 70, as also illustrated in FIG. 1. The top three lines, carrying all the symbol decisions except the newest symbol decision, are supplied to the coefficient multipliers in the DFE 60, as illustrated in FIGS. 1 and 2.

More specifically, the bottom three signal lines from the output terminal of the first multiplexer 402 are coupled to corresponding signal lines at an input terminal of the first latch 404. The three signal lines from an output terminal of the first latch 404 are coupled to the corresponding topmost three signal lines of the respective first data input terminals of the first multiplexer 402 and the second multiplexer 406. Similarly, the bottom three signal lines from the output terminal of the second multiplexer 406 are coupled to corresponding signal lines at an input terminal of the second latch 408. The three signal lines from an output terminal of the second latch 408 are coupled to the corresponding topmost three signal lines of the respective second data input terminals of the second multiplexer 406 and the first multiplexer 402. A zero-valued signal is coupled to the bottom signal line of the first data input terminal of the first multiplexer 402, a −2-valued signal is coupled to the bottom signal line of the second data input terminal of the first multiplexer 402. A +2-valued signal is coupled to the bottom signal line of the first data input terminal of the second multiplexer 406 and a zero-valued signal is coupled to the bottom signal line of the second data input terminal of the second multiplexer 406.

The multiplexer 402 operates to select the most likely newly received symbol decision sequence which results in the trellis being in state 1. Referring again to FIG. 3, if the accumulated error metric corresponding to the trellis branch from vertex 211 to vertex 221 is smaller than the accumulated error metric corresponding to the trellis branch from vertex 212 to vertex 211, then the most likely newly received symbol resulting in state 1 (vertex 221) is zero. In this case, the most likely sequence is the previous survivor sequence from state 1, SS1, with a zero-valued signal appended as the newest symbol. In this case, the selection signal SEL1 conditions the first multiplexer 402 to couple the signals from its first data input terminal to its output terminal. The bottom signal at the first data input terminal of the first multiplexer 402, representing the newest symbol decision, is a zero-valued signal. The next signal up at the first data input terminal of the first multiplexer 402 is the bottom signal from the output terminal of the first latch 404. The corresponding signal at the input terminal of the first latch 404 was from the bottom output terminal of the first multiplexer 404, representing the newest signal in the first survivor sequence SS1 from the previous symbol time. The third signal from the bottom at the first input terminal of the first multiplexer 402 derives from the second signal from the bottom at the output terminal of the first multiplexer 402, and the top signal at the first input terminal of the first multiplexer 402 derives from the third signal from the bottom at the output terminal of the first multiplexer 402. In this manner, the combination of the first multiplexer 402 and the first latch operate as a shift register for the symbols representing the branch from vertex 211 to vertex 221 in FIG. 3.

If the accumulated error metric representing the trellis branch from vertex 212 to vertex 221 is smaller than the accumulated error metric representing the trellis branch from vertex 211 to vertex 221, then the most likely newly received symbol resulting in state 1 is a −2-valued signal. In this case, the selection signal SEL1 conditions the first multiplexer to couple the signals at its second input terminal to its output terminal. The bottom signal at the second input terminal of the first multiplexer 402 is a −2-valued signal, and the other signals at the second input terminal of the first multiplexer 402 represent the previous second survivor sequence SS2 from the output terminal of the second multiplexer 406, shifted in time in a manner similar to that described above, by the second latch 408.

In a similar manner, the second multiplexer 406 produces the most likely symbol decision sequence resulting in state 2. If the accumulated error metric corresponding to the trellis branch from vertex 212 to vertex 222 is smaller than the accumulated error metric corresponding to the trellis branch from vertex 211 to vertex 222, then the most likely newly received signal is zero. In this case, the second selection signal, SEL2, conditions the second multiplexer 406 to couple its second data input terminal to its output terminal. The bottom signal at the second data input terminal of the second multiplexer is a zero-valued signal, and the other signals represent the previous second survivor sequence SS2, shifted in time in the manner described above, by the second latch 408. If the accumulated error metric corresponding to the trellis branch from vertex 211 to vertex 222 is smaller than the accumulated error metric corresponding to the trellis branch from vertex 212 to vertex 222, then the most likely newly received signal is a +2-valued signal. In this case, the second selection signal, SEL2, conditions the second multiplexer 406 to couple its first data input terminal to its output terminal. The bottom signal at the first data input terminal is a +2-valued signal, and the other signals represent the previous first survivor sequence SS1, shifted in time in the manner described above, by the first latch 404. As described above, the multiplexer 59 then selects the most likely one of the two survivor sequences SS1 or SS2, based on the value of the updated error metrics, EM1 and EM2 calculated as described above with reference to FIG. 4.

One disadvantage to using a maximum likelihood sequence detector is that during acquisition of the timing and/or equalization loops, e.g. when playback is just begun, it is possible that error propagation in the sequence detector will dominate the error events themselves, thereby producing a higher error rate than would be produced by a symbol-by-symbol detector. To compensate for this disadvantage during acquisition, the MLSD 50 illustrated in the present application is further modified to operate using variable length survivor sequences. Referring again to FIG. 1, the monitor and control unit (MCU) 130 provides a control signal to the MLSD 50 to control the size of the survivor sequence. The MCU 130 monitors the signal-to-noise ratio (SNR) of the input signal via the error signal e from the subtractor 100, and changes the sequence length in the MLSD 50, and the delay times in the respective variable delay elements 110 and 120, based on the trend of the SNR.

Referring back to FIG. 5, in order to provide the capability of changing the size of the survivor sequence, two further multiplexer control circuits are provided and, along with the signal paths related to this capability, are illustrated in phantom. A first multiplexer control circuit 410 is coupled between the output terminal of the first multiplexer 402 and the input terminal of the first latch 404, and a second multiplexer control circuit 412 is coupled between the output terminal of the second multiplexer 406 and the input terminal of the second latch 408. Respective control input terminals of the first and second multiplexer control circuits 410 and 412 are both coupled to a corresponding output terminal of the monitor and control circuit (MCU) 130. These control input terminals receive a signal, SS SIZE, which controls the size of the survivor sequence.

In the first multiplexer control circuit 410, a control circuit CC has an input terminal coupled to receive the survivor size, SS SIZE, signal. An output terminal of the control circuit CC is coupled to respective control input terminals of three multiplexers, A, B and C. The bottommost multiplexer A has a first data input terminal coupled to the bottommost signal at the output terminal of the first multiplexer 402, and a second data input terminal coupled to the bottommost signal at the output terminal of the multiplexer 59. The middle multiplexer B has a first data input terminal coupled to the second signal from the bottom at the output terminal of the first multiplexer 402 and a second data input terminal coupled to the second signal from the bottom at the output terminal of the multiplexer 59. The top multiplexer C has a first input terminal coupled to the third signal from the bottom at the output terminal of the first multiplexer 402 and a second data input terminal coupled to the third signal from the bottom at the output terminal of the multiplexer 59. Respective output terminals of the three multiplexers A, B and C are coupled to corresponding input terminals of the first latch 404.

Similarly, in the second control circuit 412, a control circuit CC has an input terminal coupled to receive the survivor size, SS SIZE, signal. An output terminal of the control circuit CC is coupled to respective control input terminals of three further multiplexers A, B and C. The bottommost multiplexer A has a first data input terminal coupled to the bottommost signal at the output terminal of the second multiplexer 406, and a second data input terminal coupled to the bottommost signal at the output terminal of the multiplexer 59. The middle multiplexer B has a first data input terminal coupled to the second signal from the bottom at the output terminal of the second multiplexer 406 and a second data input terminal coupled to the second signal from the bottom at the output terminal of the multiplexer 59. The top multiplexer C has a first input terminal coupled to the third signal from the bottom at the output terminal of the second multiplexer 406 and a second data input terminal coupled to the third signal from the bottom at the output terminal of the multiplexer 59. Respective output terminals of the three multiplexers A, B and C are coupled to corresponding input terminals of the second latch 408.

In operation, the three multiplexers, A, B, and C, in the respective control circuits 410 and 412 are controlled by signals from the respective control circuits CC. Each multiplexer is controlled independently of the others. In normal operation, that is after the acquisition of timing and the filter coefficients, the SS SIZE signal conditions the respective multiplexer control circuits 410 and 412 to set the survivor sequence size to its maximum permitted size. In this mode of operation, all of the three multiplexers A, B and C in both of the control circuits 410 and 412 are conditioned to couple the signals at their first input terminals, i.e. from the first multiplexer 402 or the second multiplexer 406, respectively, to their output terminals. The operation of the portion of the MLSD 50 illustrated in FIG. 5 in that case, is as described above.

However, when the operation of the MLSD 50 is started, the SS SIZE signal conditions the respective multiplexer control circuits 410 and 412 to set the survivor sequence size to its minimum permitted size, which contains zero symbol decisions. In this case, all of the three multiplexers A, B and C in both of the control circuits 410 and 412 are conditioned to couple the signals at their second input terminals, from the multiplexer 59, to their output terminals. In this mode of operation, the respective first and second latches, 404 and 408, receive their input signals from the output terminal of the multiplexer 59, and the respective first and second data input terminals of the first and second multiplexers 402 and 406 all receive identical data, suitably time shifted in the manner described above. Thus, no matter what symbol decisions are made on the basis of the newly received signal, the same time shifted signals are supplied to all four input terminals of the first and second multiplexers 402 and 406. When the control circuits 410 and 412 are conditioned by the SS SIZE signal in this manner, the portion of the MLSD 50 illustrated in FIG. 5 operates as a normal shift register. In this manner, coefficient and timing acquisition can proceed as if a standard transverse filter was operating as the DFE 60.

As the signal to noise ratio of the received sequence of symbols improves due to the acquisition of the proper timing reference, and the convergence of the coefficients in the FFE 30 and the DFE 60, the survivor sequence length may be increased. To do this, the MCU generates an SS SIZE signal which conditions the respective first and second multiplexer control circuits 410 and 412 in change the size for the survivor sequence. For example, the SS SIZE signal may indicate that the survivor sequence size should be increased to contain one symbol decision. In this case, the respective control circuits CC in both the first and second multiplexer control 410 and 412 circuits produce control signals for their respective three multiplexers, A, B and C, which causes the bottommost multiplexer A to couple the signal from its first input terminal, i.e. from the multiplexer 402, to its output terminal, while the other two multiplexers, B and C, still couple the signals from their second input terminals, i.e. from the multiplexer 59, to their output terminals.

While in this mode, one symbol decision being fed back to the respective first and second input terminals of the first and second multiplexers 402 and 406 is selected from one of the two survivor sequences SS1 or SS2 produced at the output terminals of the first and second multiplexers 402 and 406, respectively. The remaining two symbol decisions are supplied in common to all the input terminals of the first and second multiplexers 402 and 406 from the output terminal of the multiplexer 59. Similarly, if the SS SIZE signal indicates that the survivor sequence size is to be two symbols, then the respective multiplexers A and B of both the first and second multiplexer control circuits 410 and 412 are each conditioned to couple its first input terminals (coupled to the respective output terminals of the first and second multiplexers 402 and 406) to its output terminal while the respective third multiplexers C are each conditioned to couple its second input terminals (coupled to the output terminal of the multiplexer 59) to its output terminal. In this manner, the size of the survivor sequence may be continuously varied from zero to the maximum size possible.

In addition to the potential error propagation from the use of maximum likelihood sequences for symbol decisions during acquisition, there is a similar effect resulting from the use of accumulated error metrics for symbol decisions during acquisition. Referring again to FIG. 4, the third and fourth multiplexers, 332 and 334 respectively, may be used to disable the accumulation of error metrics during acquisition. During the acquisition period, the MCU 130 (of FIG. 1) produces a control signal for the control input terminals of the third and fourth multiplexers 332 and 334 which conditions them to both couple the zero-valued signal at their respective second input terminals to their output terminals. This in turn causes the respective first, second, third and fourth adders 312, 320, 328 and 330, to produce output signals representing only the respective branch metrics BM3, BM2, BM1 and BM4 for the newly received symbol, without any contribution from previously received symbols as represented by the previous accumulated error metrics EM1 and EM2.

When the survivor sequence portion of the MLSD 50 illustrated in FIG. 5 is configured as a shift register (i.e. the survivor sequence size is zero), as described above, and the metric calculation portion of the MLSD 50 illustrated in FIG. 4 is conditioned to ignore previous accumulated error metrics, as just described, then the MLSD 50 operates in the same manner as a prior art slicer. While in this configuration, the timing circuits and filter coefficients may converge without additional error propagation. As the timing and equalization loops begin to converge, the SNR, represented by the inverse of the error signal e from the subtractor 100, begins to increase.

In FIG. 3, the permissible ideal signals which may be received at any symbol time are +2, zero and −2. When variance of the error signal e drops below about one, this indicates that the timing circuits and filter coefficients have begun to converge, and an eye is opening in the eye-pattern. At this point in a preferred embodiment, the calculation of the error metrics EM1 and EM2 is switched from being made equal to the branch metrics for the current symbol, to being accumulated with previous error metric signals $EM1_C$ and $EM2_C$, as described above. Referring to FIG. 4, this switch is performed by the MCU 130 generating a control signal for the third and fourth multiplexers 332 and 334, respectively, conditioning them to enter the normal operating mode, as described in detail above.

Also in a preferred embodiment, when the variance drops below about one-half, the use of a full size survivor sequence is enabled. In FIG. 5, the MCU, this is performed by the MCU 130 generating an SS SIZE control signal for the first and second multiplexer control circuits, 410 and 412 respectively, which conditions all the respective multiplexers A, B and C to enter the normal operating mode, as described in detail above. At this point, the MLSD 50 is operating as a Viterbi decoder. It is also possible for the survivor sequence size to be gradually increased as the SNR increases. In FIG. 5, in such an embodiment, first the respective multiplexers A in the multiplexer control circuits 410 and 412 are placed in the normal operating mode. After a further increase in the SNR respective multiplexers A and B are placed in the normal operating mode. Finally, when the SNR has increased again, all of the multiplexers A, B and C are placed in the normal operating mode.

With reference to FIG. 1, it is possible for the symbol decision supplied to the subtractor 100 to be selected from among all the symbol decisions in the most likely survivor sequence in the MLSD 50. An arrangement to perform this function is illustrated in phantom in FIG. 5 by a selector circuit 416. An input terminal of the circuit 416 is coupled to the output terminal of the multiplexer 59, and an output terminal of the circuit 416 is coupled to the subtractor 100. A control input terminal (not shown) of the circuit 416 is coupled to a corresponding output terminal of the MCU 130. In operation, all the symbol decisions available in the most likely survivor sequence, produced at the output terminal of the multiplexer 59 as described above, are supplied to the input terminal of the circuit 416. The circuit 416 couples one of the symbol decisions to its output terminal in response to the control signal from the MCU 130. In addition, as described above, the MCU 130 sends a related control signal to the variable delay circuit 110 to properly time-align the equalized received signal supplied to one input terminal of the subtractor 100 with the symbol decision supplied to its other input terminal. The circuit 416 may, for instance, include a four-input multiplexer, with its respective data input terminals coupled to the output terminal to the multiplexer 59, its output terminal coupled to the subtractor 100 and its control input terminal coupled to the MCU 130.

With reference to FIG. 1, it is possible for the three time-adjacent symbol decisions supplied to the detector 70 to be selected from among all the symbol decisions in the most likely survivor sequence in the MLSD 50. An arrangement to perform this function is illustrated in phantom in FIG. 5 by a selector circuit 414. An input terminal of the circuit 414 is coupled to the output terminal of the multiplexer 59, and an output terminal of the circuit 414 is coupled to the detector 70. A control input terminal (not shown) of the circuit 414 is coupled to a corresponding output terminal of the MCU 130. In operation, all the symbol decisions available in the most likely survivor sequence, produced at the output terminal of the multiplexer 59, as described above, are supplied to the input terminal of the circuit 414. The circuit 414 couples one set of three time-adjacent symbol decisions to its output terminal in response to the control signal from the MCU 130. In addition, as described above, the MCU 130 sends a related control signal to the variable delay circuit 120 to properly time-align the equalized received signal supplied to one input terminal of the detector 70 to the three time-adjacent symbol decisions supplied to the other input terminal of the detector 70. The circuit 414 may, for instance, include a cross point switch, barrel shifter, or other switching arrangement, coupled between its input terminal and its output terminal.

The data detector has been described so far in conjunction with an embodiment for detecting bilevel data signals previously recorded on a magnetic medium. However, a data detector may also be used for detecting multilevel data signals. For example, in a proposed digital television transmission system, a sequence of multilevel symbols is generated to represent the television signal. In one proposed digital television system, the multilevel symbols are quadrature amplitude modulated (QAM) symbols selected from a 32, 64 or 128 symbol constellation in a known manner. The data detector of the invention may be adapted to detect such QAM signals in the following manner.

Figure 6:
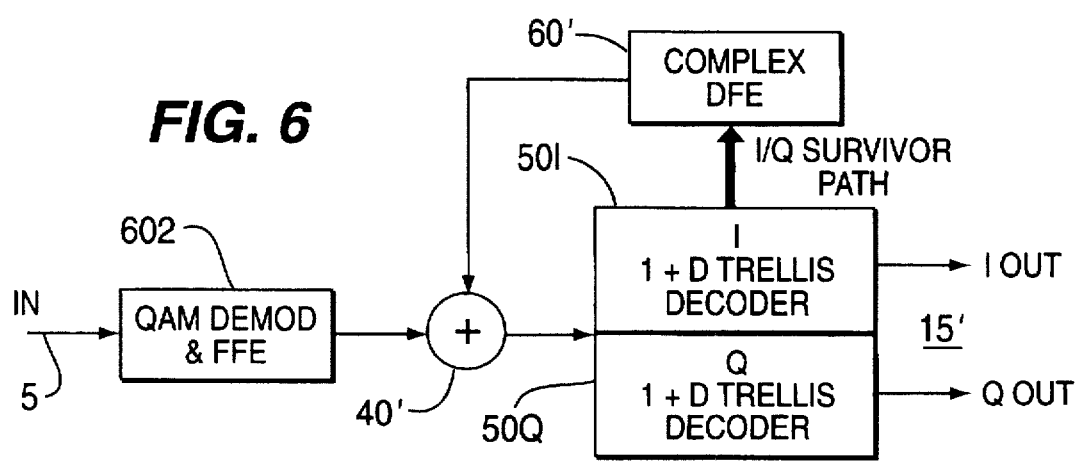
FIG. 6 is a block diagram of a data detector of the invention adapted to detect multilevel QAM symbols.

FIG. 6 is a block diagram of a data detector adapted to detect multilevel QAM symbols. In FIG. 6, the input terminal 5 is coupled to an input terminal of a QAM demodulator and feedforward equalizer 602. An output terminal of the QAM demodulator and feedforward equalizer 602 is coupled to a first input terminal of an adder 40'. An output terminal of the adder 40' is coupled to an input terminal of a combined I1+D trellis decoder 50I and a Q1+D trellis decoder 50Q. An output terminal of the combined trellis decoders 50I and 50Q is coupled to an input terminal of a complex DFE 60' and an output terminal of the complex DFE 60' is coupled to a second input terminal of the adder 40'. Respective output terminals of the combined trellis decoders 50I and 50Q are coupled to a complex output terminal 15', and produce the detected I component and Q component respectively.

The system illustrated in FIG. 6 operates in a similar manner to that illustrated in FIG. 1. The QAM demodulator and feedforward equalizer 602 corresponds to, and performs the same functions as, the filter 10, fixed equalizer 20, FFE 30, detector 70, LPF 80 and NCO 90 of FIG. 1. Each of the 1+D trellis decoders includes a Viterbi decoder, which produces a most likely survivor sequence, and is constructed in a similar manner to the decoder illustrated in FIGS. 2, 4 and 5 and described in detail above. One skilled in the art of QAM data detectors will understand what modifications are necessary and how to implement such modifications.

The most likely survivor path produced by the decoders 50I and 50Q consists of a plurality of complex symbol decisions. The complex symbol decisions in the survivor path are supplied to the complex decision feedback equalizer 60', which is arranged in a similar manner to the DFE 60 illustrated in FIG. 2. That is, the DFE 60' includes a plurality of complex coefficient multipliers (not shown) respectively responsive to the plurality of complex symbol decisions in the survivor sequence, and a summer, responsive to the plurality of coefficient multipliers. The DFE 60' operates as an adaptive least mean squares equalizer, in response to an error signal (not shown), to shape the desired channel characteristics, and suppress trailing ISI, as described above. One skilled in the art of QAM data detection will also understand that the use of a symbol decision from the survivor sequence to estimate the error signal, and of three time-adjacent symbol decisions to adjust the sampling phase, as described above, may also be adapted for the QAM data detector illustrated in FIG. 6.

Finally, a prior art feedforward equalizer is a relatively complicated filter, which, as described above, requires a large number of complicated taps in order to adequately shape the channel characteristics. A feedforward equalizer of the invention requires fewer complex taps because the decision feedback equalizer is used to shape the channel characteristics, in addition to suppressing ISI. This decreases the cost of such a feedforward equalizer and increases the reliability due to decreases parts count.

A QAM data detector according to the invention provides improved performance due to the use of the more reliable most likely survivor sequence as input to the DFE. In addition, the FFE, which requires relatively more complicated filter taps than the DFE, may be made shorter. This results in a more reliable and less expensive data detector system.

It is to be understood that the apparatus and method of operation taught herein are illustrative of the invention. Modifications may readily be devised by those skilled in the art without departing from the spirit or scope of the invention.

What is claimed is:

1. A data detector for processing a data signal representing a sequence of symbols, comprising:
   a Viterbi decoder for producing a plurality of survivor sequences including a plurality of symbol decisions and a plurality of error metrics respectively corresponding to the plurality of survivor sequences;
   a multiplexer, connected to said Viterbi decoder, having a plurality of input terminals responsive to the plurality of survivor sequences, and an output terminal producing a most likely survivor sequence, said Viterbi decoder conditioning the multiplexer to produce at its output terminal the survivor sequence having the smallest corresponding error metric as the most likely survivor sequence; and
   a decision feedback equalizer, connected to said multiplexer, responsive to the most likely survivor sequence.

2. The detector of claim 1 wherein the decision feedback equalizer comprises:
   a plurality of coefficient multipliers respectively responsive to the plurality of symbol decisions in the most likely survivor sequence; and
   a signal combiner, connected to the plurality of coefficient multipliers, responsive to the plurality of coefficient multipliers.

3. The detector of claim 1 further comprising:
   a feedforward equalizer; and
   a signal combiner, having a first input terminal coupled to the feedforward equalizer, a second input terminal coupled to the decision feedback equalizer, and an output terminal coupled to the Viterbi decoder.

4. The detector of claim 1 wherein the decision feedback equalizer is an adaptive least mean square decision feedback equalizer.

5. The detector of claim 4 wherein:
   the adaptive least mean square decision feedback equalizer is responsive to an error signal; and the detector further comprises:
   an error estimator, coupled to the Viterbi decoder for generating the error signal.

6. The detector of claim 5 wherein:
   the viterbi decoder comprises a symbol decision output terminal for producing a selected one of the plurality of symbol decisions in the survivor sequence; and
   the error estimator is coupled to the symbol decision output terminal of the viterbi decoder.

7. The detector of claim 6 wherein the one of the plurality of symbol decisions is selected to be the newest symbol decision in the survivor sequence.

8. The detector of claim 6 wherein:

the one of the plurality of symbol decisions is selected from among all the symbol decisions in the survivor sequence in response to a selection control signal; and the detector further comprises:

a monitor and control unit, responsive to the error signal, for generating the selection control signal.

9. The detector of claim 8 further comprising a variable delay element, coupled to the error estimator, and responsive to a delay time control signal for varying the delay time; wherein:

the monitor and control unit further generates the delay time control signal related to the selected one of the plurality of symbol decisions.

10. The detector of claim 5 further comprising an adaptive least mean square feedforward equalizer, coupled to the adaptive least mean square decision feedback equalizer, and responsive to the error signal.

11. The detector of claim 1 further comprising:

a signal sampler responsive to a sample timing signal from a timing control input terminal; and the detector further comprises a phase detector, responsive to the most likely survivor sequence and coupled to the timing control input terminal.

12. The detector of claim 11 wherein the phase detector is responsive to three time-adjacent symbol decisions selected from among the plurality of symbol decisions in the survivor sequence.

13. The detector of claim 12 wherein the three time-adjacent symbol decisions are selected to be the youngest three time-adjacent symbol decisions.

14. The detector of claim 12 wherein:

the selection of the three time-adjacent symbol decisions from among the plurality of symbol decisions is controlled in response to a selection control signal; and the detector further comprises a monitor and control unit for generating the selection control signal.

15. The detector of claim 14 further comprises a variable delay element coupled to the phase detector, and responsivie to a delay control signal from the monitor and control unit.

16. The detector of claim 11 further comprising the serial connection of a low pass filter and a numerically controlled oscillator coupled between the phase detector and the signal sampler.

17. A data detector for processing a data signal representing a sequence of symbols, comprising:

a maximum likelihood sequence decoder for producing a most likely survivor sequence including a plurality of symbol decisions:

a decision feedback equalizer, connected to said maximum likelihood sequence decoder, responsive to the most likely survivor sequence;

the maximum likelihood sequence decoder comprises circuitry for varying the size of the most likely survivor sequence in response to a size control signal; and a monitor and control unit for generating the size control signal.

18. The detector of claim 17 further comprising an error estimator, coupled to the maximum likelihood sequence detector, for generating an error signal; and wherein the monitor and control unit generates the size control signal in response to the error signal.

19. The detector of claim 18 wherein:

the maximum likelihood sequence detector comprises a symbol decision output terminal for producing a selected one of the plurality of symbol decisions in the survivor sequence; and the error estimator is coupled to the symbol decision output terminal of the maximum likelihood sequence detector.

20. The detector of claim 19 wherein the one of the plurality of symbol decisions is selected to be the newest symbol decision in the survivor sequence.

21. The detector of claim 19 wherein the one of the plurality of symbol decisions is selected from among all the symbol decisions in the survivor sequence in response to a selection control signal from the monitor and control unit.

22. The detector of claim 21 further comprising a variable delay element, coupled between the data signal source and the error estimator, and responsive to a delay time control signal for varying the delay time; wherein the monitor and control unit further generates the delay time control signal related to the selected one of the plurality of symbol decisions.

* * * * *